United States Patent Office 2,965,509

Patented Dec. 20, 1960

2,965,509

THERMOFLUID VEHICLES

Lewis C. Hoffman, Scotch Plains, N.J., assignor to E. I. du Pont de Nemours and Company, Wilmington, Del., a corporation of Delaware No Drawing. Filed Apr. 2, 1958, Ser. No. 725,785

16 Claims. (Cl. 106—230)

This invention relates to new and improved thermofluid vehicles useful for the preparation of ceramic coating compositions.

The decoration of ceramic or metal surfaces with vitreous enamel coatings of any desired color is customarily carried out by the squeegeeing of a colored enamel coating composition, composed of a vehicle and a finely divided vitreous color enamel, through a screen stencil onto a ceramic or metal article and firing the coated article to fuse the enamel in the coating. In order that such decorating method may be carried out rapidly, the art has developed thermofluid vehicles for such colored enamel compositions. Such thermofluid vehicles melt at a temperature slightly above room temperature and freeze rapidly when the squeegeed paste contacts a ceramic or metal surface at about room temperature.

Thermofluid vehicles used in the art are of two general types, those comprised of a combination of a thermoplastic resin and a wax as exemplified in U.S. Patents Nos. 2,607,701, 2,607,702, and 2,682,480, or those comprised of an all-wax medium as exemplified in U.S. Patents Nos. 2,617,740 and 2,823,138.

Although both types of thermofluid vehicles are quite useful, they have not proven altogether satisfactory. As heretofore pointed out, there are so many required characteristics of a satisfactory vehicle for enamel coating compositions that to produce a completely suitable composition is very complicated. One of the outstanding objectionable characteristics of both types of previously known thermofluid vehicles is the retention of screen markings on the fired enamel compositions. Thermofluid vehicles must retain a required stiffness or viscosity upon being submitted to enamel firing temperatures to prevent their running from the desired coating area. Consequently such enamel compositions will retain screen markings present as a result of their freezing upon contact with the relatively cold surface to be decorated.

It is an object of this invention to provide new and improved thermofluid vehicles.

It is another object of this invention to provide thermofluid resin-wax and all-wax vehicles for enamel coating compositions which will not run upon firing of the enamel coating compositions but will be smoothed out to eliminate any screen markings or other irregularities on the coating surfaces.

Other objects of the invention will appear hereinafter.

The objects of this invention may be accomplished by the addition, to a thermofluid vehicle of either the resin-wax or all-wax type, of an anionic surface active agent comprising the alkaline reaction product of $POCl_3$ with a saturated aliphatic monohydroxy alcohol having 8 to 18 carbon atoms, or with a mixture of such an alcohol and an aliphatic glycol in which the carbon atoms to which the hydroxyl radicals are attached are separated by at least 4 carbon atoms. The addition to a thermofluid vehicle of between 0.5% and 15% by weight of the vehicle of such anionic surface active agent has been found to make the vitreous enamel color coating composition prepared with such vehicle self-smoothing to eliminate any screen marks or other coating roughness in the applied coating composition without imparting to the composition any tendency to run during firing of the coated article.

The anionic surface active agents of this invention may be prepared by reacting $POCl_3$ with a saturated monohydroxy aliphatic alcohol having 8 to 18 carbon atoms and neutralizing or preferably slightly alkalinizing the reaction product. For example, $POCl_3$ may be reacted with octanol, decanol, lauryl, cetyl or stearyl alcohols and the reaction product neutralized with a slight excess of an alkaline material. The preferred alkaline materials are alkali metal hydroxides and amines, particularly tertiary aliphatic amines, for example, trimethylamine, triethylamine or triethanolamine.

The anionic agents may also be prepared by reacting the $POCl_3$ with a saturated monohydroxy aliphatic alcohol of 8 to 18 carbon atoms and a saturated aliphatic glycol in which the carbon atoms to which the hydroxyl radicals are attached are separated by at least 4 carbon atoms, for example, 1,6 hexanediol, 2,2 diethyl-1,3-propanediol, triethylene glycol, tetraethylene glycol and polyethylene glycols having a molecular weight of up to 4000. The $POCl_3$ may be reacted with a mixture of the said monohydroxy alcohols and glycols, or it may be reacted in turn with the alcohol or glycol and then with the glycol or alcohol.

The neutralization is preferably carried out with at least a small excess of the alkaline material to produce a pH of at least 8. If desired, the alkalinization may be carried out to a pH of 12, depending to some extent on the alkalinizing material used. The resultant neutral or alkaline $POCl_3$-alcohol or $POCl_3$-alcohol-glycol surface active agent is then admixed with a thermofluid vehicle in the proportion of 0.5% to 15% by weight of the vehicle.

The following examples illustrate a number of preferred procedures for obtaining suitable phosphate ester anionic agents for use in the present invention.

*Example 1*

To a mixture of 28.4 parts of 1,6 hexanediol and 34.5 parts of 3,3,5 trimethylhexanol-1 is added 37.1 parts of $POCl_3$. The mixture is heated to a temperature of 70° C. and maintained at this temperature until gas evolution ceases. When the reaction is complete, as evidenced by cessation of gas evolution, the straw-colored viscous oil is allowed to cool to room temperature and then alkalinized by the addition thereto of 100 parts of triethanolamine to produce the desired anionic phosphate ester surface active agent.

*Example 2*

33.5 parts of 1,6 hexanediol is reacted with 33.5 parts of $POCl_3$ by heating to 70° C. in the atmosphere. When the reaction is complete, 33.5 parts of octanol-1 is added, and the further reaction completed as evidenced by cessation of gas evolution. After cooling the resultant product to approximately room temperature, 10 parts of 40% solution of aqueous sodium hydroxide is added. The resultant slightly alkaline product is suitable for use as an anionic surface active agent in accordance with the present invention.

*Example 3*

70 parts of 3,3,5 trimethylhexanol-1 is added to 30 parts of $POCl_3$. The mixture is heated to approximately 70° C. at which temperature the reaction takes place until gas evolution ceases. The resultant material is allowed to cool to room temperature and is then neutralized by the addition of 100 parts of triethanolamine to produce a phosphate ester anionic surface active agent suitable for use in accordance with the invention.

*Example 4*

30 parts of "Carbowax" 200, a polyethylene glycol sold by Carbide and Carbon Chemicals Corporation, having an average molecular weight of about 200, was mixed with 45 parts of decanol. 25 parts of $POCl_3$ was then added and the mixture heated to a temperature of about 70° C. and maintained at this temperature until cessation of gas evolution. The resultant product was then cooled and neutralized by the addition of 10 parts of 40% aqueous solution of potassium hydroxide.

The following tabulated materials were reacted in accordance with the procedure outlined in Example 1 above to obtain suitable phosphate ester anionic surface active agents for use in the present invention.

| Example Number | Glycol | Alcohol | $POCl_3$, parts | Alkalinized |
|---|---|---|---|---|
| 5 | ---------- | 70 parts cetyl alcohol. | 30 | 100 parts triethanolamine. |
| 6 | 17 parts 1,6 hexanediol. | 51 parts lauryl alcohol. | 32 | Do. |
| 7 | 10 parts "Carbowax" 1000. | 55 parts stearyl alcohol. | 35 | 10 parts 40% NaOH. |
| 8 | 10 parts "Carbowax" 750. | 65 parts cetyl alcohol. | 25 | Do. |
| 9 | ---------- | 70 parts 3,3,5 trimethylhexanol-1. | 30 | Do. |
| 10 | 1 part 1,6 hexanediol. | 61 parts 3,3,5 trimethylhexanol-1. | 38 | Do. |
| 11 | 18 parts 1,6 hexanediol. | 59 parts normal stearyl alcohol. | 23 | 100 parts triethanolamine. |

Finely divided vitreous enamel is normally agglomerated in a thermofluid vehicle. This may be readily seen in a microscope under suitable magnification. The particles are collected into aggregates and when two particles contact each other, they tend to stick together. Even when they are set in motion, they move as large collective groups and not as individuals. It is desirable that they act as individuals because in the transient stage of melting during firing of a thermofluid decoration, they will tend to level out the mesh marks in the print proportional to the extent of dispersion present. I accomplish this dispersion by the addition to the thermofluid vehicle of an anionic surface active agent of the type hereinabove described.

The amount of anionic agent for noticetable effect is 0.5% to 1% of the vehicle. Most of the agents are liquids or soft solids and excessive amounts tend to cause reduction in solidification temperature of the vehicles. I have found about 5% to be optimum and 15% to be a safe maximum dependent, of course, on the physical nature of the agent.

As shown in the patents above referred to, both the resin-wax and the all-wax types of vehicles are basically comprised of a fusible substance having a melting point of between about 47° C. and 110° C. and having the property of rapidly solidifying at room temperature. Such vehicles may also in some cases contain small amounts of a solvent for said resin or wax and optionally small amounts of modifying substances.

Resin-wax types of vehicles contain a thermoplastic resin in combination with a wax or wax-like material. As resins the vehicle may contain rosin, abietic acid, hydrogenated rosin, dimerized rosin, rosin esters, polymerized resin acids, resinous chlorinated diphenyls, pliolite, ethyl cellulose, or the like. As waxes may be mentioned vegetable waxes such as carnauba wax or candelilla wax, or other waxes such as beeswax, paraffin wax, microcrystalline wax, or spermaceti wax. As wax-like materials may be named palmitic acid, stearic acid, solid soaps, or synthetic waxes such as wax-like amides and amines or polyethylene glycol, often referred to as "Carbowax." Such resins and waxes are mixed in specific proportions in a known manner to obtain the desired characteristics of melting point, rapidity of hardening, viscosity, volatility during firing, and the like. In the case of all-wax types of vehicles, the thermoplastic resins are omitted and the vehicle is basically composed of waxes, both natural and synthetic, and thickening wax-like materials such as polyethylene glycols with wax solvents such as saturated monohydroxy alcohols of 12 to 18 carbon atoms, monohydric carboxylic acids of 12 to 18 carbon atoms or paraffin wax having a melting point of about 45 to 75° C.

Modifying agents such as soya lecithin, phosphorated tall oil or the like may be added to impart resistance to moisture condensation, or urea or diphenyl to impart toughness to the coatings.

In preparing the colored vitreous enamel coating compositions, the above-described thermofluid vehicles are mixed with vitreous enamel colors in proportions of between 1:1 to 6:1 of enamel colors to vehicle. The vitreous enamel colors generally consist of 5% to 20% of inorganic oxide pigments and 95% to 80% of finely divided glass frit. The glass frit may be lead, cadmium, antimony or other metal borosilicates.

ALL-WAX VEHICLES FOR USE WITH VITREOUS ENAMEL COLORS IN PROPORTIONS SPECIFIED

*Example 12*

550 parts of vitreous enamel color (10% $TiO_2$ pigment-90% ground lead borosilicate glass) was heated to 200° C. and placed in a mixing container. 30 parts of "Carbowax" 6000 (polyethylene glycol having an average molecular weight of about 6000 to 7500) and 65 parts of normal stearyl alcohol was added to and mixed with the vitreous enamel color. The resulting molten paste was allowed to cool below 80° C., after which 5 parts of "Alipal" GB-520 (a product produced by Antara Chemicals and comprising an anionic surface active agent composed of the sodium hydroxide alkalinized $POCl_3$ reaction product of a higher alcohol) was added and mixed in. The resulting paste was passed through a 3-roll mixing mill, the rolls of which were maintained at a temperature of 70–80° C.

The resultant vitreous enamel color composition was suitable in every respect for stencil screen application onto ceramic surfaces, having the requisite viscosity and the property of rapidly freezing upon contact with a surface having room temperature. In the firing step to which the coated ceramic article is submitted, when the color composition is remelted, the screen mesh marks and any other roughness in the surface of the coated article are smoothed out to a much greater extent than with a similar control color composition made without the anionic surface active agent.

The procedure of Example 12 was followed with the following compositions in the proportions set forth below with similar results to those obtained by the practice of Example 12.

*Example 13*

| | Parts |
|---|---|
| "Carbowax" 6000 (polyethylene glycol having an average molecular weight of about 6000 to 7500) | 40 |
| Normal stearyl alcohol | 55 |
| Anionic phosphate ester product obtained from Example 1 | 5 |
| Vitreous enamel color | 500 |

*Example 14*

| | |
|---|---|
| "Carbowax" 6000 (polyethylene glycol having an average molecular weight of about 6000 to 7500) | 20 |
| "Siponol TX" (a mixed fatty alcohol made and sold by American Alcolac Corp.—$C_{12}$–$C_{14}$, 4%—$C_{16}$–$C_{18}$, 92%; M.P. 48–52° C.) | 70 |
| Anionic phosphate ester product obtained from Example 2 | 10 |
| Vitreous enamel color | 550 |

*Example 15*

| | |
|---|---|
| "Carbowax" 20,000 (polyethylene glycol having an average molecular weight of 15,000 to 20,000) | 25 |
| "Carbowax" 1540 (polyethylene glycol having an average molecular weight of 1300 to 1600) | 15 |
| "Adol 64" (a mixed fatty alcohol made and sold by Archer-Daniels-Midland Corp. and containing: $C_{16}$, 24.3%—$C_{18}$, 68.6%—$C_{20}$, 7.1%) | 55 |
| Anionic phosphate ester product obtained from Example 3 | 5 |
| Vitreous enamel color | 500 |

*Example 16*

| | |
|---|---|
| "Carbowax" 4000 (polyethylene glycol having an average molecular weight of 3000 to 7000) | 50 |
| "Dytol E-46" (a fatty alcohol made and sold by Roehm & Haas Company and containing: $C_{14}$, 1.2%—$C_{16}$, 34.7%—$C_{18}$, 64.8%) | 48 |
| Anionic phosphate ester product obtained from Example 4 | 2 |
| Vitreous enamel color | 500 |

*Example 17*

| | |
|---|---|
| "Carbowax" 6000 (polyethylene glycol having an average molecular weight of 6000 to 7500) | 40 |
| Stearyl alcohol | 45 |
| Anionic phosphate ester product obtained from Example 5 | 10 |
| Vitreous enamel color | 450 |

*Example 18*

30 parts of "Carbowax" 6000 (polyethylene glycol having an average molecular weight of 6000 to 7500) were mixed with 65 parts of normal stearyl alcohol and melted and mixed at 100° C. 95 parts of this mixture were admixed with 600 parts of vitreous enamel color at 100° C. and then allowed to cool to 80° C. at which temperature 5 parts of the anionic surface active agent produced by Example 6 were stirred in and the mixture passed through a heated 3-roll mixing mill maintained at a temperature of about 70° C.

RESIN-WAX VEHICLES FOR USE WITH VITREOUS ENAMEL COLORS IN PROPORTIONS SPECIFIED

*Example 19*

45 parts of "Staybelite" (hydrogenated rosin produced by Hercules Powder Company), 45 parts of stearyl alcohol, and 5 parts of ethyl cellulose were mixed at approximately 100° C. until dissolved. The mixture was then cooled to solidify the same and broken into lumps and transferred to a container with 550 parts of vitreous enamel color and heated to a temperature of 200° C. After the mass was molten, it was mixed thoroughly and allowed to cool to 80° C. at which temperature 5 parts of "Alipal" GB-520 (a product produced by Antara Chemicals and comprising an anionic surface active agent composed of the sodium hydroxide alkalinized $POCl_3$ reaction product of a higher alcohol) was added, stirred in and the mass roll milled. The resultant vitreous enamel color composition is outstanding in every respect for stencil screen application onto ceramic or metal surfaces. The color composition was found to have the requisite viscosity and had the property of freezing rapidly on contact with surfaces at room temperature. In firing the coating on a ceramic or metal surface when the color composition is remelted, screen mesh marks retained thereon or other roughness of the surface of the coating were smoothed out to a much greater extent than with a control color composition made without the anionic phosphate ester.

The following examples disclose proportions of materials therein set forth which were mixed in accordance with the details of Example 19 to obtain similar highly desirable vitreous enamel color compositions.

*Example 20*

| | Parts |
|---|---|
| "Polypale" resin (a resin prepared by polymerizing the unsaturated resin acids contained in rosin produced by Hercules Powder Co.) | 35 |
| Paraffin (melting point 65°) | 60 |
| Anionic surface active agent prepared by Example 1 | 5 |
| Vitreous enamel color | 500 |

*Example 21*

| | |
|---|---|
| Rosin | 50 |
| Normal stearyl alcohol | 40 |
| Anionic surface active agent prepared by Example 7 | 10 |
| Vitreous enamel color | 450 |

*Example 22*

| | |
|---|---|
| Hydrogenated rosin | 15 |
| Rosin | 30 |
| Paraffin (melting point 65°) | 30 |
| Stearyl alcohol | 15 |
| Ethyl cellulose | 2 |
| Anionic surface active agent prepared by Example 8 | 8 |
| Vitreous enamel color | 550 |

*Example 23*

| | |
|---|---|
| "Carbowax" 6000 (polyethylene glycol having an average molecular weight of 6000 to 7500) | 20 |
| Ethyl cellulose | 5 |
| Stearyl alcohol | 70 |
| Anionic surface active agent prepared by Example 9 | 5 |
| Vitreous enamel color | 400 |

The thermofluid vehicles of the present invention may be produced with uniform characteristics from batch to batch and, when contained in vitreous enamel color compositions and applied on a ceramic or metal surface in one or a plurality of layers of different colors, the vitreous enamel may be molten, and the color compositions will have a self-smoothing character without danger of running on the surface from the design in which they are stencilled thereon. By reason of the presence of the anionic surface active agents of this invention, it is possible to incorporate large proportions of vitreous enamel colors without producing undue viscosity of the resultant paste. In all cases, the color compositions of the present invention may be extruded through screen stencils for prolonged periods of time to give clear-cut, glossy, sharp designs.

Reference in the specification and claims to parts, proportions and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

I claim:

1. A thermofluid vehicle for vitreous enamel color compositions, self-smoothing and non-running at enamel fusing temperatures, consisting essentially of a substance selected from the group consisting of thermofluid resin-wax vitreous enamel color vehicles and thermofluid all-wax vitreous enamel color vehicles and an anionic surface active agent selected from the group consisting of neutral and alkaline reaction products of $POCl_3$ and a saturated monohydroxy aliphatic alcohol having 8 to 18 carbon atoms and reaction products of $POCl_3$ and both a saturated monohydroxy aliphatic alcohol having 8 to 18 carbon atoms and an aliphatic glycol having a least 4 carbon atoms between the carbon atoms to which the hydroxyl radicals are attached, said resin-wax vehicle being composed of a thermoplastic resin, a wax, and a solvent for said resin and wax and said all-wax vehicle being composed of a mixture of polyethylene glycol having an average molecular weight of between 3,000 and 7,500 and a saturated monohydroxy aliphatic alcohol of between 12 and 18 carbon atoms.

2. A thermofluid vehicle for vitreous enamel color compositions, self-smoothing and non-running at enamel fusing temperatures, consisting essentially of a substance selected from the group consisting of thermofluid resin-wax vitreous enamel color vehicles and thermofluid all-wax vitreous enamel color vehicles and between 0.5 and 15% of an anionic surface active agent selected from the group consisting of neutral and alkaline reaction products of $POCl_3$ and a saturated monohydroxy aliphatic alcohol having 8 to 18 carbon atoms and reaction products of $POCl_3$ and both a saturated monohydroxy aliphatic alcohol having 8 to 18 carbon atoms and an aliphatic glycol having at least 4 carbon atoms between the carbon atoms to which the hydroxyl radicals are attached, said resin-wax vehicle being composed of a thermoplastic resin, a wax, and a solvent for said resin and wax, and said all-wax vehicle being composed of a mixture of polyethylene glycol having an average molecular weight of between 3,000 and 7,500 and a saturated monohydroxy aliphatic alcohol of between 12 and 18 carbon atoms.

3. A thermofluid vehicle for vitreous enamel color compositions, self-smoothing and non-running at enamel fusing temperatures, consisting essentially of a thermofluid resin-wax vitreous enamel color vehicle and an anionic surface active agent selected from the group consisting of neutral and alkaline reaction products of $POCl_3$ and a saturated monohydroxy aliphatic alcohol having 8 to 18 carbon atoms and reaction products of $POCl_3$ and both the saturated monohydroxy aliphatic alcohol having 8 to 18 carbon atoms and an aliphatic glycol having at least 4 carbon atoms between the carbon atoms to which the hydroxyl radicals are attached, said resin-wax vehicle being composed of a thermoplastic resin, a wax, and a solvent for said resin and wax.

4. A thermofluid vehicle for vitreous enamel color compositions, self-smoothing and non-running at enamel fusing temperatures, consisting essentially of a thermofluid all-wax vitreous enamel color vehicle and an anionic surface active agent selected from the group consisting of neutral and alkaline reaction products of $POCl_3$ and a saturated monohydroxy aliphatic alcohol having 8 to 18 carbon atoms and reaction products of $POCl_3$ and both the saturated monohydroxy aliphatic alcohol having 8 to 18 carbon atoms and an aliphatic glycol having at least 4 carbon atoms between the carbon atoms to which the hydroxyl radicals are attached, said all-wax vehicle being composed of a mixture of polyethylene glycol having an average molecular weight of between 3000 and 7,500 and a saturated monohydroxy aliphatic alcohol of between 12 and 18 carbon atoms.

5. A thermofluid vehicle for vitreous enamel color compositions, self-smoothing and non-running at enamel fusing temperatures, consisting essentially of a substance selected from the group consisting of thermofluid resin-wax vitreous enamel color vehicles and thermofluid all-wax vitreous enamel color vehicles and an anionic surface active agent selected from the group consisting of alkali metal hydroxide and amine alkalinized reaction products of $POCl_3$ and a saturated monohydroxy aliphatic alcohol having 8 to 18 carbon atoms and reaction products of $POCl_3$ and both a saturated monohydroxy aliphatic alcohol having 8 to 18 carbon atoms and an aliphatic glycol having at least 4 carbon atoms between the carbon atoms to which the hydroxyl radicals are attached, said resin-wax vehicle being composed of a thermoplastic resin, a wax, and a solvent for said resin and wax, and said all-wax vehicle being composed of a mixture of polyethylene glycol having an average molecular weight of between 3,000 and 7,500 and a saturated monohydroxy aliphatic alcohol of between 12 and 18 carbon atoms.

6. A thermofluid vehicle for vitreous enamel color compositions, self-smoothing and non-running at enamel fusing temperatures, consisting essentially of a substance selected from the group consisting of thermofluid resin-wax vitreous enamel color vehicles and thermofluid all-wax vitreous enamel color vehicles and an anionic surface active agent selected from the group consisting of alkali metal hydroxide and tertiary amine alkalinized reaction products of $POCl_3$ and a saturated monohydroxy aliphatic alcohol having 8 to 18 carbon atoms and reaction products of $POCl_3$ and both a saturated monohydroxy aliphatic alcohol having 8 to 18 carbon atoms and an aliphatic glycol having at least 4 carbon atoms between the carbon atoms to which the hydroxyl radicals are attached, said resin-wax vehicle being composed of a thermoplastic resin, a wax, and a solvent for said resin and wax, and said all-wax vehicle being composed of a mixture of polyethylene glycol having an average molecular weight of between 3,000 and 7,500 and a saturated monohydroxy aliphatic alcohol of between 12 and 18 carbon atoms.

7. A thermofluid vehicle for vitreous enamel color compositions, self-smoothing and non-running at enamel fusing temperatures, consisting essentially of a thermoplastic resin, a wax, and a solvent for said resin and wax and a tertiary amine alkalinized reaction product of $POCl_3$ and a saturated monohydroxy aliphatic alcohol having 8 to 18 carbon atoms.

8. A thermofluid vehicle for vitreous enamel color compositions, self-smoothing and non-running at enamel fusing temperatures, consisting essentially of a thermoplastic resin, a wax and a solvent for said resin and wax, and a tertiary amine alkalinized reaction product of $POCl_3$ and both a saturated monohydroxy aliphatic alcohol having 8 to 18 carbon atoms and an aliphatic glycol having at least 4 carbon atoms between the carbon atoms to which the hydroxyl radicals are attached.

9. A vitreous enamel color composition, self-smoothing and non-running at enamel fusing temperatures consisting essentially of a finely divided vitreous enamel color, a substance selected from the group consisting of thermofluid resin-wax vitreous enamel color vehicles and thermofluid all-wax vitreous enamel color vehicles and an anionic surface active agent selected from the group consisting of neutral and alkaline reaction products of $POCl_3$ and a saturated monohydroxy aliphatic alcohol having 8 to 18 carbon atoms and reaction products of $POCl_3$ and both a saturated monohydroxy aliphatic alcohol having 8 to 18 carbon atoms and an aliphatic glycol having at least 4 carbon atoms between the carbon atoms to which the hydroxyl radicals are attached.

10. A vitreous enamel color composition, self-smoothing and non-running at enamel fusing temperatures consisting essentially of a finely divided vitreous enamel color, a substance selected from the group consisting of thermofluid resin-wax vitreous enamel color vehicles and thermofluid all-wax vitreous enamel color vehicles and between 0.5 and 15% of an anionic surface active agent selected from the group consisting of neutral and alkaline reaction products of $POCl_3$ and a saturated monohydroxy aliphatic alcohol having 8 to 18 carbon atoms and reaction products of $POCl_3$ and both a saturated monohydroxy aliphatic alcohol having 8 to 18 carbon atoms and an aliphatic glycol having at least 4 carbon atoms between the carbon atoms to which the hydroxyl radicals are attached.

11. A vitreous enamel color composition, self-smoothing and non-running at enamel fusing temperatures, consisting essentially of a finely divided vitreous enamel color, a thermofluid resin-wax vitreous enamel color vehicle, and a substance selected from the group consisting of neutral and alkaline reaction products of $POCl_3$ and a saturated monohydroxy aliphatic alcohol having 8 to 18 carbon atoms and reaction products of $POCl_3$ and both the saturated monohydroxy aliphatic alcohol having 8 to 18 carbon atoms and an aliphatic glycol having at least 4 carbon atoms between the carbon atoms to which the hydroxyl radicals are attached, said resin-wax vehicle being composed of a thermoplastic resin, a wax, and a solvent for said resin and wax.

12. A vitreous enamel color composition, self-smoothing and non-running at enamel fusing temperatures consisting essentially of a finely divided vitreous enamel color, a thermofluid all-wax vitreous enamel color vehicle, and a substance selected from the group consisting of neutral and alkaline reaction products of $POCl_3$ and a saturated monohydroxy aliphatic alcohol having 8 to 18 carbon atoms and reaction products of $POCl_3$ and both the saturated monohydroxy aliphatic alcohol having 8 to 18 carbon atoms and an aliphatic glycol having at least 4 carbon atoms between the carbon atoms to which the hydroxyl radicals are attached, said all-wax vehicle being composed of a mixture of polyethylene glycol having an average molecular weight of between 3000 and 7500 and a saturated monohydroxy aliphatic alcohol of between 12 and 18 carbon atoms.

13. A vitreous enamel color composition, self-smoothing and non-running at enamel fusing temperatures, consisting essentially of a finely divided vitreous enamel color, a substance selected from the group consisting of thermofluid resin-wax vitreous enamel color vehicles and thermofluid all-wax vitreous enamel color vehicles and an anionic surface active agent taken from the group consisting of alkali metal hydroxide and amine alkalinized reaction products of $POCl_3$ and a saturated monohydroxy aliphatic alcohol having 8 to 18 carbon atoms and reaction products of $POCl_3$ and both a saturated monohydroxy aliphatic alcohol having 8 to 18 carbon atoms and an aliphatic glycol having at least 4 carbon atoms between the carbon atoms to which the hydroxyl radicals are attached.

14. A vitreous enamel color composition, self-smoothing and non-running at enamel fusing temperatures, consisting essentially of a finely divided vitreous enamel color, a substance selected from the group consisting of thermofluid resin-wax vitreous enamel color vehicles and thermofluid all-wax vitreous enamel color vehicles and an anionic surface active agent selected from the group consisting of alkali metal hydroxide and tertiary amine alkalinized reaction products of $POCl_3$ and a saturated monohydroxy aliphatic alcohol having 8 to 18 carbon atoms and reaction products of $POCl_3$ and both a saturated monohydroxy aliphatic alcohol having 8 to 18 carbon atoms and an aliphatic glycol having at least 4 carbon atoms between the carbon atoms to which the hydroxyl radicals are attached.

15. A vitreous enamel color composition, self-smoothing and non-running at enamel fusing temperatures, consisting essentially of a finely divided vitreous enamel color, a thermoplastic resin, a wax, and a solvent for said resin and wax, and a tertiary amine alkalinized reaction product of $POCl_3$ and a saturated monohydroxy aliphatic alcohol having 8 to 18 carbon atoms.

16. A vitreous enamel color composition, self-smoothing and non-running at enamel fusing temperatures, consisting essentially of a finely divided vitreous enamel color, a thermoplastic resin, a wax and a solvent for said resin and wax, and a tertiary amine alkalinized reaction product of $POCl_3$ and both a saturated monohydroxy aliphatic alcohol having 8 to 18 carbon atoms and an aliphatic glycol having at least 4 carbon atoms between the carbon atoms to which the hydroxyl radicals are attached.

References Cited in the file of this patent

UNITED STATES PATENTS

| | | |
|---|---|---|
| 2,005,619 | Graves | June 18, 1935 |
| 2,190,210 | Kaber | Feb. 13, 1940 |
| 2,318,803 | Schneider et al. | May 11, 1943 |
| 2,607,701 | Jessen | Aug. 19, 1952 |
| 2,607,702 | Jessen | Aug. 19, 1952 |
| 2,617,740 | Morris | Nov. 11, 1952 |
| 2,656,372 | Ernest et al. | Oct. 20, 1953 |
| 2,682,480 | Andrews | June 29, 1954 |
| 2,823,138 | Hoffman | Feb. 11, 1958 |

FOREIGN PATENTS

| | | |
|---|---|---|
| 669,987 | Great Britain | Apr. 9, 1952 |
| 552,719 | Great Britain | Apr. 21, 1943 |
| 452,508 | Great Britain | Aug. 24 1936 |